US012623744B2

(12) United States Patent
Chen et al.

(10) Patent No.: US 12,623,744 B2
(45) Date of Patent: May 12, 2026

(54) BICYCLE, IN PARTICULAR AN ELECTRIC BICYCLE

(71) Applicant: MA Micro Limited, Woking (GB)

(72) Inventors: Yi-Fang Chen, Woking (GB);
Alexandre Phaneuf, Woking (GB);
Chun-Hsun Kao, Woking (GB);
Chien-I Chen, Woking (GB);
Mao-Chieh Tang, Woking (GB);
Chien-Cheng Kung, Woking (GB); Job Hendrik Stehmann, Woking (GB)

(73) Assignee: MA Micro Limited, London (GB)

( * ) Notice: Subject to any disclaimer, the term of this patent is extended or adjusted under 35 U.S.C. 154(b) by 145 days.

(21) Appl. No.: 18/699,047

(22) PCT Filed: Oct. 7, 2022

(86) PCT No.: PCT/NL2022/050573
§ 371 (c)(1),
(2) Date: Apr. 5, 2024

(87) PCT Pub. No.: WO2023/059198
PCT Pub. Date: Apr. 13, 2023

(65) Prior Publication Data
US 2024/0409173 A1 Dec. 12, 2024

(30) Foreign Application Priority Data

Oct. 7, 2021 (NL) ...................................... 2029353
Mar. 15, 2022 (NL) ...................................... 2031282

(51) Int. Cl.
B62J 50/22 (2020.01)
B62J 6/01 (2020.01)
(Continued)

(52) U.S. Cl.
CPC ................. B62J 50/22 (2020.02); B62J 6/01 (2020.02); B62K 21/12 (2013.01); B62K 21/26 (2013.01)

(58) Field of Classification Search
CPC .. B62K 21/12; B62K 21/26; B62J 6/24; B62J 6/057
See application file for complete search history.

(56) References Cited

U.S. PATENT DOCUMENTS

| | | | |
|---|---|---|---|
| 4,071,892 A | 1/1978 | Genzling | |
| 2005/0067207 A1* | 3/2005 | Radtke | B60L 15/2063 180/223 |

(Continued)

FOREIGN PATENT DOCUMENTS

| | | |
|---|---|---|
| CN | 205098402 U | 3/2016 |
| DE | 102018211727 A1 | 1/2020 |
| WO | 2019203643 A2 | 10/2019 |

*Primary Examiner* — Mirza F Alam
(74) *Attorney, Agent, or Firm* — The Webb Law Firm

(57) ABSTRACT

The invention relates to a vehicle, preferably a bicycle, in particular an electric bicycle. The invention also relates to an optical feedback unit for use in a vehicle, preferably a bicycle, in particular an electric bicycle according to the invention. The invention further relates to a vehicle control unit, in particular a bicycle control unit, programmed to control at least one optical feedback unit for use in a vehicle, preferably a bicycle, in particular an electric bicycle according to the invention. The invention moreover relates to an assembly of at least one optical feedback unit according to the invention and at least one vehicle control unit, in particular a bicycle control unit, according to the invention.

20 Claims, 8 Drawing Sheets

(51) Int. Cl.
  *B62K 21/12*       (2006.01)
  *B62K 21/26*       (2006.01)

(56)               References Cited

U.S. PATENT DOCUMENTS

| | | | |
|---|---|---|---|
| 2006/0285343 A1* | 12/2006 | Okajima | B62J 6/015 |
| | | | 362/473 |
| 2019/0127005 A1* | 5/2019 | Regnier | B62K 21/12 |
| 2021/0197913 A1* | 7/2021 | Montez | B62K 23/02 |
| 2023/0008184 A1* | 1/2023 | Baumgaertner | B62M 6/50 |

* cited by examiner

BICYCLE, IN PARTICULAR AN ELECTRIC BICYCLE

CROSS REFERENCE TO RELATED APPLICATIONS

This application is the United States national phase of International Patent Application No. PCT/NL2022/050573 filed Oct. 7, 2022, and claims priority to The Netherlands Patent Application No. 2029353 filed Oct. 7, 2021 and The Netherlands Patent Application No. 2031282 filed Mar. 15, 2022, the disclosures of which are hereby incorporated by reference in their entireties.

BACKGROUND OF THE INVENTION

Field of the Invention

The invention relates to a vehicle, preferably a bicycle, in particular an electric bicycle. The invention also relates to an optical feedback unit for use in a vehicle, preferably a bicycle, in particular an electric bicycle according to the invention. The invention further relates to a vehicle control unit, in particular a bicycle control unit, programmed to control at least one optical feedback unit for use in a vehicle, preferably a bicycle, in particular an electric bicycle according to the invention. The invention moreover relates to an assembly of at least one optical feedback unit according to the invention and at least one vehicle control unit, in particular a bicycle control unit, according to the invention.

Description of Related Art

Over the last 150 years, the bicycle has evolved to become one of the most efficient means of transportation in terms of conversion of energy into distance travelled. The efficiency of the bicycle has also been optimized to minimize the effort required by the rider. For instance, most modern bicycles include an efficient gear system to minimize rider effort. To further reduce the amount of human effort required to propel a bicycle, a variety of electric bicycles (e-bikes) have been introduced, wherein use is made of an electromotor as auxiliary power source to assist the manpowered pedaling process. These developments have resulted in faster bicycles, which facilitates bicycling at high speeds. Because of the increased speed, bicycle riding has become increasingly more dangerous, which leads to increased risks for cyclists to become involved in accidents with other vehicles and pedestrians. Furthermore, due to ongoing technical developments more and more data are collected, which can be used for various purposes. There is a need to increase data feedback from the e-bike to the user, in particular during cycling, which among others allows the user to drive the e-bike in a safer and more controlled manner.

SUMMARY OF THE INVENTION

It is a first object of the invention to provide an improved bicycle, in particular an electric bicycle, which allows to the user to receive bicycle status related feedback during cycling.

It is a second object of the invention to provide an improved bicycle, in particular an electric bicycle, with an improved optical solution to provide bicycle status related feedback to the user during cycling.

At least one of these objects can be met by providing a bicycle, in particular an electric bicycle, and/or a bicycle part, comprising:

preferably a bicycle frame, a handlebar rotatably mounted or mountable to said bicycle frame, at least one optical feedback unit for providing bicycle and/or user related optical feedback, in particular bicycle drive status related feedback, to a user of the bicycle, wherein said optical feedback unit is mounted to and/or at least partially accommodated within said handlebar, wherein said optical feedback unit comprises:

an array and/or group of optical elements, preferably light emitting diodes (LEDs), preferably at least one casing which is at least partially transparent and/or translucent, and which at least partially covers said optical elements, wherein said casing preferably has an exposed outer surface which is substantially similarly shaped to at least one adjacent outer surface portion of the handlebar, and wherein at least one of the plurality of optical elements is controllable based on a control signal to provide said optical feedback to the user, and preferably at least one bicycle control unit for generating at least one control signal for controlling at least one optical element of said optical feedback unit.

The bicycle or vehicle type, such as tricycle or pedal car, according to the invention, hereinafter simply referred to as bicycle, has several advantages. By accommodating one or more optical feedback units on and/or within the handlebar of a bicycle, the one or more optical feedback units are directly located in the line of sight of the user. In this way feedback, preferably bicycle and/or user related feedback, can be provided to the user in a simple and efficient manner. The optical feedback given to the user can be of (very) basic nature, for example by, dependent on the feedback to be provided to the user, illuminating (switching on) more optical elements or less optical elements, and/or by changing the illumination level and/or colour temperature and/or colour of one or more optical elements. In a basic embodiment of the optical feedback unit, the unit comprises two, three, four, of five optical elements, such as LEDs, which are arranged in a row, which array of optical elements may e.g., function as linear gauge or linear chart. It is preferred that the at least one optical feedback unit does not protrude with respect to the handlebar and/or that the at least one optical feedback unit limitedly protrudes with respect to the handlebar. This limited protrusion can e.g., be realized in the case the protrudes less than 1.0 cm, more preferably less than 0.75 mm. It is preferred that the optical elements are at least partially protected (shielded) by means of an at least partially transparent and/or translucent casing and/or an alternative at least partially transparent and/or translucent cover layer. Preferably, an exposed outer surface of said casing or alternative cover layer is preferably substantially similarly shaped to at least one adjacent outer surface portion of the handlebar. This leads to a compact construction of the optical feedback unit(s) on and/or within the handlebar, which prevents, or at least reduces the risk of, damaging of the optical feedback unit(s), and which moreover, leads to a more aerodynamic design of the bicycle, which saves energy during cycling. The exposed portion is the portion that is exposed to the user (and to weather conditions). Although the at least one optical feedback unit is primarily configured to optically provide status related feedback to the user, the optical feedback unit(s) and/or any other component of the bicycle may be configured to additionally also give bicycle status and/or user status related feedback to the user by means of audio signals, such as sound and/or speech.

Preferably, the handlebar at least partially encloses at least one optical feedback unit. In this embodiment, the optical feedback is at least partially accommodated within (a hollow space of) the handlebar. At least one through-hole in the handlebar allows the optical feedback unit(s) to remain visible for the user. A seal, such as a sealing O-ring, preferably made of rubber-elastic material, may be applied in between the handlebar and the optical feedback unit(s), wherein such a seal preferably is applied in, at, or near the through-hole (opening) applied in the handlebar to prevent water to leak into the handlebar. Preferably, the at least one handlebar opening is defined by a peripheral edge, wherein the exposed outer surface of said optical feedback unit abuts said peripheral edge. Preferably, at least a part, preferably at least a peripheral portion, of the exposed outer surface of said casing is positioned substantially flush (aligned) with said peripheral edge of the handlebar opening. Preferably, the (entire) exposed outer surface of said casing is positioned substantially flush with said peripheral edge of the handlebar opening.

As indicated above, it is preferred that at least a part of the exposed surface, preferably the entire exposed surface, of said casing is positioned substantially flush (aligned) with at least one, preferably each, adjacent outer surface portion of the handlebar, and/or the adjacent outer surface portion of the handlebar surrounding the casing. This allows the optical feedback unit to be relatively unobtrusive. This not only provides a more attractive appearance of the bicycle, it may also prevent accidental impact on the feedback unit. That is, common feedback units are external add-on devices which significantly protrude with respect to the handlebar since they are typically mounted onto said handlebar. As such these external devices are prone to impact of an object or human. For example, a jacket of a user may clamp or get stuck behind said external devices. To this end the essentially flush design of the preset invention eliminates this risk, whilst still allowing for providing sufficient feedback. In particular it is difficult to provide for a feedback unit which is both unobtrusive as well as able to sufficiently indicate feedback. That is, the optical elements allow for indicating a wide variety of modes and status of the bicycle.

The add-on devices typically comprise a substantial display which provides for sufficient space to display large amounts of text, whereas the present invention has achieved to provide this feedback by means of visual representation by the optical elements of a status. Hence, the present invention significantly reduces the needed space for providing the same level of feedback to the user compared to the add on devices.

The exposed outer surface of said casing (or alternative cover layer) may be flat (plane), although it is often more preferred that this exposed outer surface is at least partially curved, preferably convexedly curved. Typically, the handlebar also comprises an at least partially curved, preferably convexedly curved, outer surface. Preferably, the at least partially curved exposed outer surface of said casing (or alternative cover layer) has a curvature which substantially corresponds with a curvature of at least one adjacent outer surface portion of the handlebar. Preferably, said at least one adjacent outer surface portion of the handlebar, which is located adjacently to the exposed portion of the casing, makes part of a tubed part of the handlebar. As said, the optical feedback unit may at least partially be accommodated within the (tubed part of the) handlebar. It is also imaginable that the optical feedback unit is at least partially positioned on top of an outer surface of the handlebar.

Preferably, the handlebar comprises at least two grips located at opposing outer ends of the handlebar, and a central handlebar portion located in between said grips, and wherein at least one optical feedback unit is located in between one of said grips and said central handlebar portion. The grip is preferably composed of a more flexible and/or rubbery material compared to the remaining handlebar portion to improve the user's grip and comfort during cycling. It is preferred that the handlebar comprises opposing narrowed end portions integrally connected to the central handlebar portions, wherein each of said narrowed end portions is at least partially accommodated within a grip of the handlebar. Preferably, each grip is slid over a narrowed end portions and clamped around this end portion and/or glued onto this end portion.

In a preferred embodiment, at least one optical feedback unit at least partially encloses the handlebar. As indicated above, at least one optical feedback unit may be affixed, directly or indirectly, on top of (an outer surface of) the handlebar.

Preferably, at least one optical feedback unit and the handlebar are substantially coaxially oriented. This concentric orientation leads to a compact and efficient design. The at least one optical feedback unit is preferably substantially annular shaped (ring-shaped). This does not have to be a continuous ring, but may also be, and this is often preferred, partially ring-shaped (annular sector shaped), which may e.g., by a cylindrical (sector) shape.

Preferably, at least a number of the plurality of optical elements are equidistantly divided in a circumferential direction over the handlebar, preferably stretching over at least a curved portion of the handlebar.

In a preferred embodiment, at least three optical elements of the optical feedback unit are arranged in at least one linear array (1D array), wherein said linear array preferably extending, as seen from a top view, in a linear direction substantially parallel with a plane defined by the bicycle frame. Preferably, the optical feedback unit comprises a plurality of linear arrays, each array being formed by at least two or three optical elements, wherein the linear arrays are preferably oriented side-by-side (2D array or 3D Array). Alternatively or additional, it is imaginable that the optical feedback unit comprises at least four optical elements of the optical feedback unit are arranged in a flat, curved, and/or angular matrix array (2D array or 3D array). In another preferred embodiment, the optical feedback unit comprises a plurality of spaced arrays of optical elements, wherein the spaced arrays may e.g., run in parallel and/or may be situated in the same (flat or curved) plane, and/or may orientated such that the optical elements of different arrays are oriented in a facing manner. Typically, one or more arrays of optical elements are borne and/or mounted onto at least one carrier or substrate, such as printed circuit board (PCB). Such a carrier may at least partially be flat and/or may at least partially be curved and/or annular (or annular sectioned) shape, and may, for example form one or more LED rings (or other light rings). It is imaginable that at least one optical feedback unit comprises a plurality of such carriers, such as two carriers. Preferably each carrier is configured to receive a control signal. It is imaginable that optical elements of different carriers and/or different arrays of optical elements are optically grouped such that this group of optical elements can be controlled collectively (simultaneously).

It is preferred that at least one bicycle control unit is connected to at least one optical feedback unit, and wherein said bicycle control unit is configured to control said optical feedback unit. Said bicycle control unit can be a central bicycle control unit and/or an auxiliary bicycle control unit configured to generate one or more control signals to control the at least one optical feedback unit.

At least one bicycle control unit may be configured to generate at least one control signal, or at least a part of at least one control signal, based upon at least one bicycle drive status information type chosen from the group consisting of: the actual bicycle battery level, the actual motor support, changed settings related information, alarm function, bicycle related errors, bicycle related error codes, the actual speed, the average speed, the number of revolutions per minute (RPM), the selected gear, the ambient temperature, the ambient light level, and navigation related information, like the remaining distance, the remaining time, and the estimated time of arrival. At least a part of the navigation related information may be communicated by a portable or wearable user device, such as a smartphone and/or a smartwatch to the bicycle control unit and forward as control signal(s) and/or converted by the bicycle control unit in (other) control signals for the one or more optical feedback units.

Preferably, the communication between at least one bicycle control unit and at least one optical feedback unit is realized by using a bicycle bus (bicycle data bus), such as a CAN bus (Controller Area Network protocol-based bus). To this end, each optical feedback unit, and in particular each controllable optical element (light source), preferably comprises an own optical feedback control unit and/or optical element control unit, respectively. By means of a data bus connection, such as a CAN bus connection, the control units (controllers) are allowed to communicate openly with one another. Typically, the CAN protocol includes built-in features such as a cyclical redundancy code (CRC) check that allows detection of signal errors during transmission, storage, and retrieval. Here, preferably, each optical feedback unit and/or each optical element (or group of optical elements) is assigned with a unique identifier (ID), and each control signal preferably comprises at least one ID related segment. In this latter preferred case, the receiving controllers performs a filtering operation, and more in particular executes an acceptance test on the ID incorporated in the signal to determine if the signal, and thus the remaining signal content, is relevant to that controller. Only the controller(s) which recognized the signal will process said signal. Other controller(s) will normally the signal, which makes it rather simple, efficient and practical to control one or more optical elements out of a total number of controllable optical elements by using a single signal. Hence, the control signal comprises information to control a selective number of optical elements corresponding with the bicycle related feedback to be given to the user. Preferably, at least one control signal comprises information relating to at least two bicycle drive status information types. More in particular, said combined control signal is preferably configured to display at least one first bicycle drive status information type via at least one first group of, preferably linearly arranged, optical elements of said optical feedback unit, and to display at least one second bicycle drive status information type via at least one second group of, preferably linearly arranged, optical elements of said optical feedback unit.

It is preferred that the optical feedback unit comprises at least one (optical) separating element, for separating light emitted by at least two, preferably adjacent, optical elements. An example of such an optical separating element is for example a wall or other physical optical divider. Such a separating element has the advantage that optical feedback can be given by the optical feedback unit(s) is a more clear manner, wherein the risk of confusion with the user can be minimized. In this manner optical compartments are actually created which is in favour of the interpretation of the feedback at the side of the user. The one or more separating elements make preferably (integral) part of a part of the casing, preferably a bottom wall of the casing. Although discrete separated optical compartments may be used to provide feedback to the user, it is also imaginable that at least one optical feedback unit comprises a liquid-crystal display (LCD) configured to be backlit by the optical elements of said optical feedback unit. Such an LCD is preferably at least partially embedded in the casing and/or covered by the casing and/or alternative cover layer.

At least one optical element is preferably formed by a light source, more preferably chosen from the group consisting of: a light-emitting diode (LED), an organic light-emitting diode (OLED), a laser diode, a multi-colour light source, a capsule wherein at least one red, at least one green and at least one blue diode are potted (SMD), a single-colour light source; and combinations thereof. In the SMD embodiment red, green and blue diodes are preferably potted in a small plastic encapsulation which is surface mounted on the printed circuit boards. When the diodes are encapsulated in this way, they take up a less space, making it possible to produce compact feedback units with a relatively high resolution and adjustable colours.

The casing may be configured to entirely house the array(s) of optical elements, preferably in a watertight manner. The casing may be formed by a single component. However, the casing is often composed of a plurality of mutually affixed components, such as a bottom wall and at least one at least partially transparent and/or translucent cover layer (cover lid), wherein the at least one cover layer is at least partially exposed to the user. At least one cover layer and/or the exposed portion of the casing is at least partially composed of glass or a, preferably scratch-resistant, polymer, such as an acrylic polymer, like polycarbonate. It is imaginable that this glass and/or polymer has a milky appearance (opalescent appearance) in order to diffuse light in a more uniform manner. It is imaginable that at least one cover layer is composed of a substantially opaque and/or less translucent material, wherein said cover layer is provided with a pattern of light openings to realize a preferred light pattern for the user. According to a preferred embodiment, at least a portion of the casing is composed out of a polymer material. It is imaginable that said polymer is at least partially translucent, or at least allowing light to pass through. The casing may be injection molded, which allows for a simplified production process. According to a preferred embodiment the casing is injection molded having a VDI scale (wherein VDI stands for "Vereines Deutscher Ingenieure") surface finish of VDI 23, or at least in between 22.5 and 23.5, preferably as obtained from a VDI 3400 surface comparator. Preferably said surface finish has a surface roughness of about 1 to 2 $\mu$m, preferably about 1.4 $\mu$m. The optical feedback unit preferably comprises at least one fastening element to fixate the optical feedback unit to the handlebar. Such a fastening element may e.g., be a clamp and/or a screw. The optical feedback unit may be resilient (to some extent) and/or may comprise a resilient rear layer allowing the optical feedback unit to be resiliently clamped onto, and preferably around, the handlebar. In this latter embodiment, a separate fastening element is not needed.

According to a preferred embodiment the optical feedback unit comprises at least one positioning element, in particular a positioning protrusion, preferably at least two positioning elements. However, it is also conceivable more of said positioning elements are applied. These one or more positioning elements allow and/or facilitate a proper positioning, in particular a proper alignment, of the optical feedback unit with respect to the handlebar and optional other adjacent components. The one or more positioning elements may be configured to hold the optical feedback unit in place, and hence to fixate the optical feedback unit with respect to the handlebar and/or one or more adjacent components. Said at least one positioning element may at least partially be formed by a sideward tongue. It is conceivable that said positioning element simultaneously forms the fastening element according to the invention. In this respect it is conceivable that said at least one positioning element, in particular said sideward tongue, forms a clamping surface. The sideward tongue may be accommodated in a recess or groove of an adjacent handlebar component. It is conceivable that said positioning element is provided on a lower side of the feedback unit, in particular the casing. As such, it is possible to allow at least one grip to slide over the positioning element. The grip may be provided with a recess or accommodating space for accommodating therein said positioning element in installed condition of the grip. More preferably, said positioning element, in particular the sideward tongue, is provided on opposing sides of the feedback unit, in particular the casing. In this respect, both sides of the feedback unit may be rigidly clamped into place. On one side this may for example be achieved via a portion of a grip sliding over the positioning element. on the other side opposing side, this may for example be achieved by an accommodating space or recessed portion of the central portion of the handlebar. An additional benefit may be that the positioning element of the casing may prevent the grip from being able to rotate around the handlebar. Said positioning element may thus block the rotational movement of the grip, which ensures a clear and proper view of the optical feedback unit during cycling.

Preferably, at least a portion of at least one surface, in particular a portion of at least one sideward surface, of the optical feedback unit is provided with at least one light blocking element, such as a light blocking sheet or coating. This sheet or coating may be attached as separate layer to the optical feedback unit. However, it is also imaginable that this sheet or coating, like any other coating (if applied), is applied during manufacturing of (another part of) the optical feedback unit, for example by means of injection moulding and/or (co-)extrusion. The optical elements of the optical feedback unit may be encapsulated by casing material during this same production process. This light blocking element may prevent light from unintentional leaking. This may e.g., occur near or at the location where a grip is adjacent to a side surface of the casing, or where a central portion of the handlebar is adjacent to a side surface. Although it is preferred that the grip or central portion of the handlebar perfectly adjoin said side surfaces of the casing, in practice there will be an ever so small gap. The light blocking element, provided on the side surface, may prevent light from leaking trough said connections between the grip and central portion of the handlebar and the casing. Leaking of light is undesired since it may cause the user to be wrongly informed of the feedback. It is preferred that at least one light blocking element is at least partially formed by a light blocking sheet. It is conceivable that said light blocking is adhered, e.g., by means of glue, to at least one side surface of the casing. Alternatively, the light blocking element may e.g., partially be formed by a light blocking paint provided on at least a portion of one side surface of the casing.

The optical feedback unit is preferably connected to at least one bicycle control by at least one wired connection, wherein said wire(s) is/are at least partially routed inside the handlebar. It is imaginable that the wire(s) is/are guided from each optical feedback unit into a space enclosed by a narrowed end portion of the handlebar and a grip mounted onto said narrowed end portion, wherein the wire is subsequently led into a tube part of the handlebar and optionally into the bicycle frame, and from there to at least one bicycle control unit. In this embodiment, it is preferable the narrowed end portion of the handlebar and/or the grip is provided with at least one channel extending from the feedback control unit to an outer end of the narrowed end portion to allow a predefined guidance of the wire(s).

Instead of or in addition to generating a control signal based upon a bicycle status parameter, it may be preferred that at least one bicycle control unit configured to generate at least one control signal for at least one optical feedback unit is, directly or indirectly, configured to communicate with at least one portable user device, such as a smartphone or smartwatch, and wherein said bicycle control unit is configured to at least partially base said control signal on user related information received from the portable user device, such as health related information, like for example the heart rate and/or burned calories, and/or navigation related information.

By applying at least two of said optical feedback units, wherein said optical feedback units preferably have an identical shape, more simultaneous feedback can be given to the user.

It is imaginable that each feedback type is assigned its own colour (colour temperature), which may or may not be customized by the user, to use the same feedback control unit to display different feedback types based upon different colours. Preferably, at least two optical feedback units are arranged on or adjacent to opposing end portions of the handlebar. Preferably, at least two optical feedback units are positioned side-by-side. It is imaginable that the at least two optical feedback units are independently controllable, preferably wherein the at least two optical feedback units are configured to collectively display, via the plurality of optical elements, a single bicycle status information type.

The bicycle may comprise at least one sensor, preferably a plurality of sensors, wherein at least one bicycle control unit is preferably configured to generate a control signal for at least one optical feedback unit, based on data collected by at least one sensor. Examples of such sensors are a light sensor, a humidity sensor, an acceleration sensor, a speed sensor, a tilt sensor, a shock sensor, a vibration sensor, a steer rotation sensor, a $CO_2$ sensor, a $O_2$ sensor, a humidity sensor, and a temperature sensor, and/or combinations thereof. A plurality one or more of these or other sensors may be applied in the bicycle. For example, in case a light sensor detects that the environmental brightness level drops below a predefined amount of Lumens, at least one light source control signal may be generated to switch one or more bicycle lights, which may include one or more optical elements of the optical feedback unit according to the invention, on and/or to brighten already switched on lights; and/or when the environmental brightness level exceeds a predefined amount of Lumens, at least one light source control signal may be generated to switch one or more bicycle lights, which may include one or more optical elements of the optical feedback unit according to the invention, off. Another example is that in case an acceleration sensor or tilt sensor of the bicycle detects a rapid stop and/or emergency stop of the bicycle, at least one light source control signal may be generated to switch one or more bicycle lights, which may include one or more optical elements of the optical feedback unit according to the invention, on, and/or to brighten and/or flash one or more already switched on lights to warn the environment, and/or to change colour of one or more bicycle lights. A further example is that in case a speed sensor detects that the bicycle speed exceeds a predefined threshold speed, at least one light source control signal may be generated to e.g. to switch on one or more bicycle lights, which may include one or more optical elements of the optical feedback unit according to the invention, and/or to brighten one or more already switched on lights (which may include one or more optical elements of the optical feedback unit according to the invention), and/or to flash one or more bicycle lights, which may include one or more optical elements of the optical feedback unit according to the invention, to warn the environment and/or the rider. Yet a further example is that in case the steer rotation sensor and/or tilt sensor detects that the bicycle is steered in a certain direction, at least one light source control signal may be generated to e.g. to switch on one or more bicycle lights, which may include one or more optical elements of the optical feedback unit according to the invention, and/or to adapt the illumination pattern of at least one bicycle light, such as a rear light and/or front light, such that the steering direction is visualized for the direct environment (traffic participants). This latter visualization can be done e.g. by flashing said light(s) and/or by creating a recognizable light pattern, such as an arrow recognizable for other traffic participants, optionally in a different or distinctive colour. Gas sensors, like a $CO_2$ sensor and a $O_2$ sensor, typically act as an electronic nose. These gas sensors and/or a temperature sensor or a humidity sensor, may be used to monitor the direct environment and to warn the bicycle user in case one or more critical thresholds are exceeded, such as temperature limit and/or humidity limit (to warn the bicycle user for slippery roads and/or to warn the bicycle for severe weather conditions), a $O_2$ limit (to warn the bicycle user in case an oxygen poor environment), etcetera. This warning may be given to the user by (automated) controlling one or more optical elements of at least one optical feedback unit according to the invention. More sophisticated algorithms based upon the data collected by a plurality of sensors in order to generate one or more light source control signals may also be applied. For example, a steering direction related control signal may only be generated in case both the steering direction sensor and the speed sensor exceed a predefined threshold value. More in general, according to this embodiment, at least one light source control signal is generated in case each of a plurality of sensors exceeds a predefined threshold value. The light source control signal may be generated directly after detection of an exceeding of at least one threshold value by at least one sensor. However, it is also imaginable that this at least one signal is created after a predefined delay and/or in case the threshold excess lasts for a predefined amount of time, such as e.g. 3, 5, or 10 seconds. As will be clear from this paragraph various alternative embodiments are conceivable in this respect.

Typically, the bicycle comprises foot pedals, wherein said pedals are, directly or indirectly, connected to the crank set of the bicycle for propelling the bicycle. Preferably, the bicycle is a pedal operable electric bicycle, also referred to as e-bike, pedelec, and speed pedelec. Preferably, the bicycle comprises at least one electromotor to drive at least one wheel of the bicycle. Typically, the bicycle comprises a pedal-operated manpower driven system and an electromotor driven system in parallel to each other, wherein at least one bicycle control unit is configured to control the output of the electromotor driven in response to a pedal depressing force of the manpower driven system.

The invention also relates to an optical feedback unit for use in a vehicle, such as a bicycle, in particular an electric bicycle according to the invention. The invention further relates to a bicycle control unit programmed to control at least one optical feedback unit for use in a bicycle, in particular an electric bicycle according to the invention. Moreover, the invention relates to at least one optical feedback unit according to the invention and at least one bicycle control unit according to the invention, wherein the optical feedback unit(s) is/are preferably connected to said at least one bicycle control unit.

The invention is further illustrated by means of the non-limitative set of clauses presented below.

1. Bicycle handlebar display assembly for displaying feedback to a rider of a bicycle on status information relating to the bicycle or a ride from a central on-board computer, the bicycle handlebar display assembly comprising:
   a housing, such as a casing, that is substantially arrangeable on an end portion of a handlebar, such as adjacent to a handgrip or handgrip body thereof,
   an array of optical elements, such as LEDs or pixels arranged in the housing,
   receiving means for receiving control information, such as at least one control signal relating to the feedback from the central on-board computer, such as a bicycle control unit.

2. Bicycle handlebar display assembly according to one or more of the preceding clauses, wherein at least one of the at least one light source is provided with a control signal processing unit for processing control signals, such as for executing a respective portion of received control signals and/or sending remaining control signals on to a further light source.

3. Bicycle handlebar display assembly according to one or more of the preceding clauses, wherein the array comprises at least one row of LEDs that are controllable as a row, such as for displaying light in linear form with at least one length-variable illuminated line segment.

4. Bicycle handlebar display assembly according to Clause 3, wherein the row of LEDs receives and displays control signals in relation to a height, level or status of a parameter of the bicycle, such as battery level, a level of current motor support, feedback relating to button input, feedback relating to an alert function of the central on-board computer, and feedback relating to fault codes of the central on-board computer, an indication relating to a level of support.

5. Bicycle handlebar display assembly according to one or more of the preceding clauses, comprising optical separating means, such as a separating element, between individual LEDs for separating the light emitted by the LEDs.

6. Bicycle handlebar display assembly according to one or more of the preceding clauses, comprising lens means for transmitting emitted light out of the housing.

7. Bicycle handlebar display assembly according to one or more of the preceding clauses, comprising diffusing means for merging light emitted by individual LEDs.

8. Bicycle handlebar display assembly according to one or more of the preceding clauses, comprising at least two rows of LEDs, wherein the at least two rows of LEDs are offset with respect to one another in order to provide an optical perception of a higher resolution and/or to provide a relatively smooth merging of light emitted by individual LEDs.

9. Bicycle handlebar display assembly according to one or more of the preceding clauses, wherein the array of optical elements comprises a screen, such as an LCD or OLED screen bicycle handlebar display assembly.

10. Bicycle handlebar display assembly according to Clause 9, comprising a control unit for the screen for operating on the basis of control signals from the central on-board computer.

11. Bicycle handlebar display assembly according to one or more of the preceding clauses, wherein the housing is arrangeable on the handlebar, preferably wherein the housing is substantially in a ring shape or wherein the housing is in an elongate ring shape, preferably wherein the housing completely encircles the handlebar in cross-sectional view or partially encircles it in side view.

12. Bicycle handlebar display assembly according to one or more of the preceding clauses, wherein the bicycle handlebar display assembly is arrangeable between a handgrip and the handlebar, preferably wherein the handlebar and the bicycle handlebar display assembly have substantially the same cross section.

13. Bicycle handlebar display assembly according to one or more of the preceding clauses, wherein the bicycle handlebar display assembly is arrangeable between securing means for the handgrip and a handgrip body.

14. Bicycle handlebar display assembly according to Clause 12 or 13, wherein the bicycle handlebar display assembly is arrangeable between securing means for the handgrip and the handlebar, preferably wherein the handlebar and the bicycle handlebar display assembly have substantially the same cross section.

15. Bicycle handlebar display assembly according to one or more of the preceding clauses, comprising securing means for securing it to the handlebar.

16. Bicycle handlebar display assembly according to one or more of the preceding clauses, comprising a cable passage for passing a cable from the exterior of the handlebar to the interior of the handlebar, preferably wherein this cable passage is closable by means of a handgrip body, securing means or the coupling connection, or a sealing means cooperating therewith.

BRIEF DESCRIPTION OF THE DRAWINGS

The terms FIG., FIGS., Figure, and Figures are used interchangeably in the specification to refer to the corresponding figures in the drawings.

The present invention will hereinafter be further elucidated based on the following non-limitative figures, wherein.

12

Figure 9:
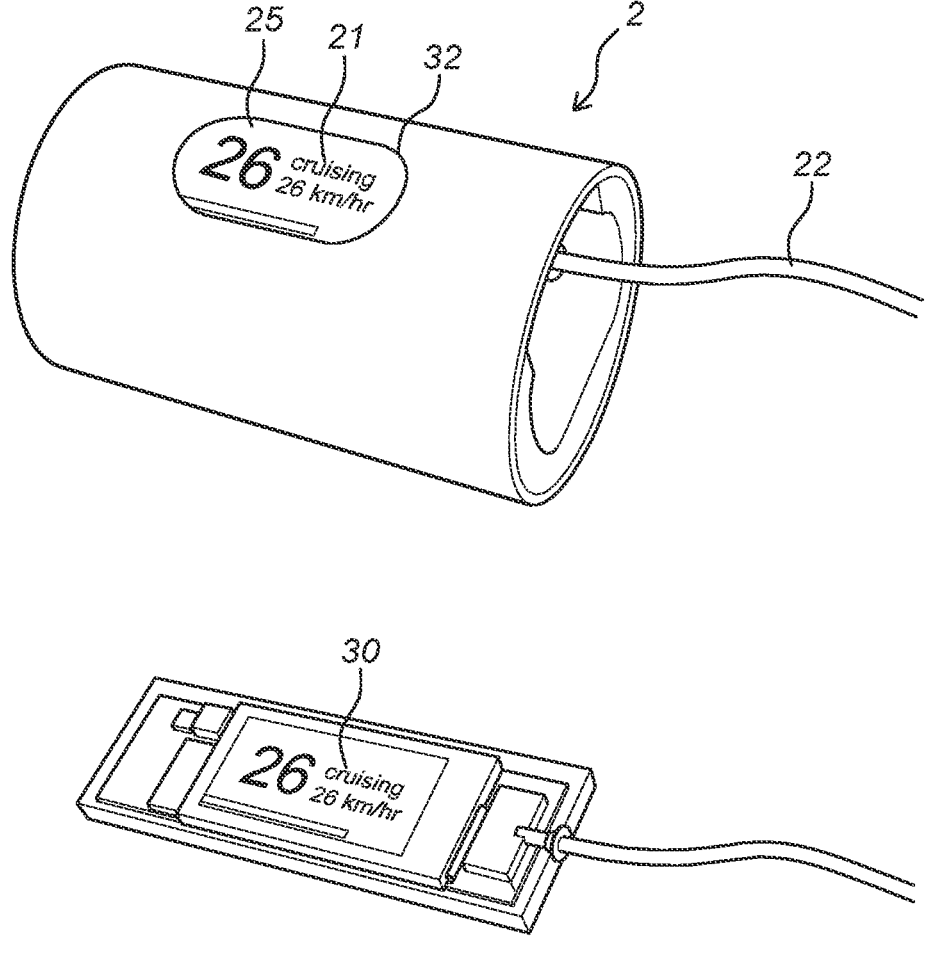

FIG. 9 shows yet another embodiment of the optical feedback unit; and

Figure 10:
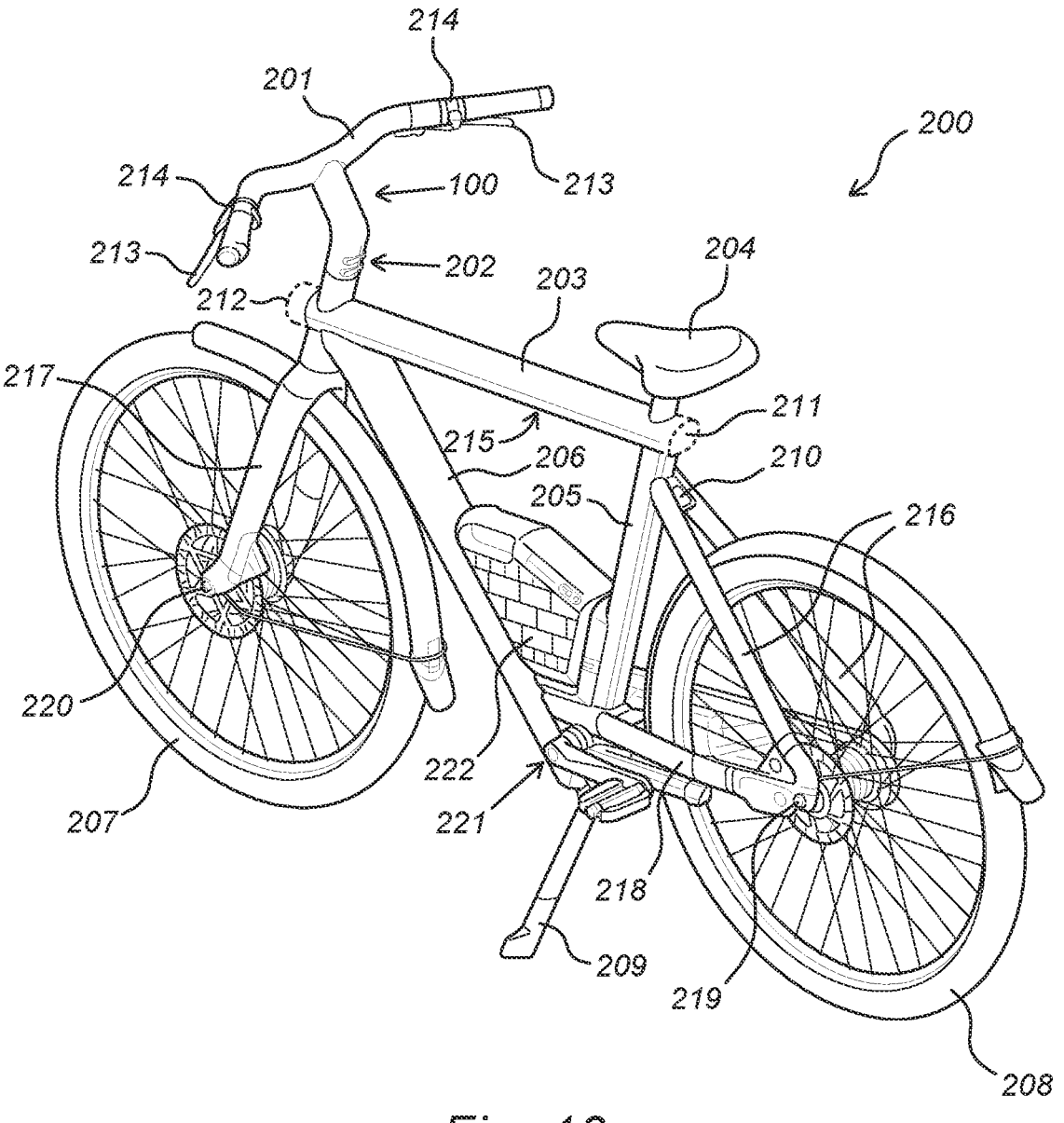

FIG. 10 shows a schematic overview of a bicycle according to the invention.

DESCRIPTION OF THE INVENTION

Figure 1:
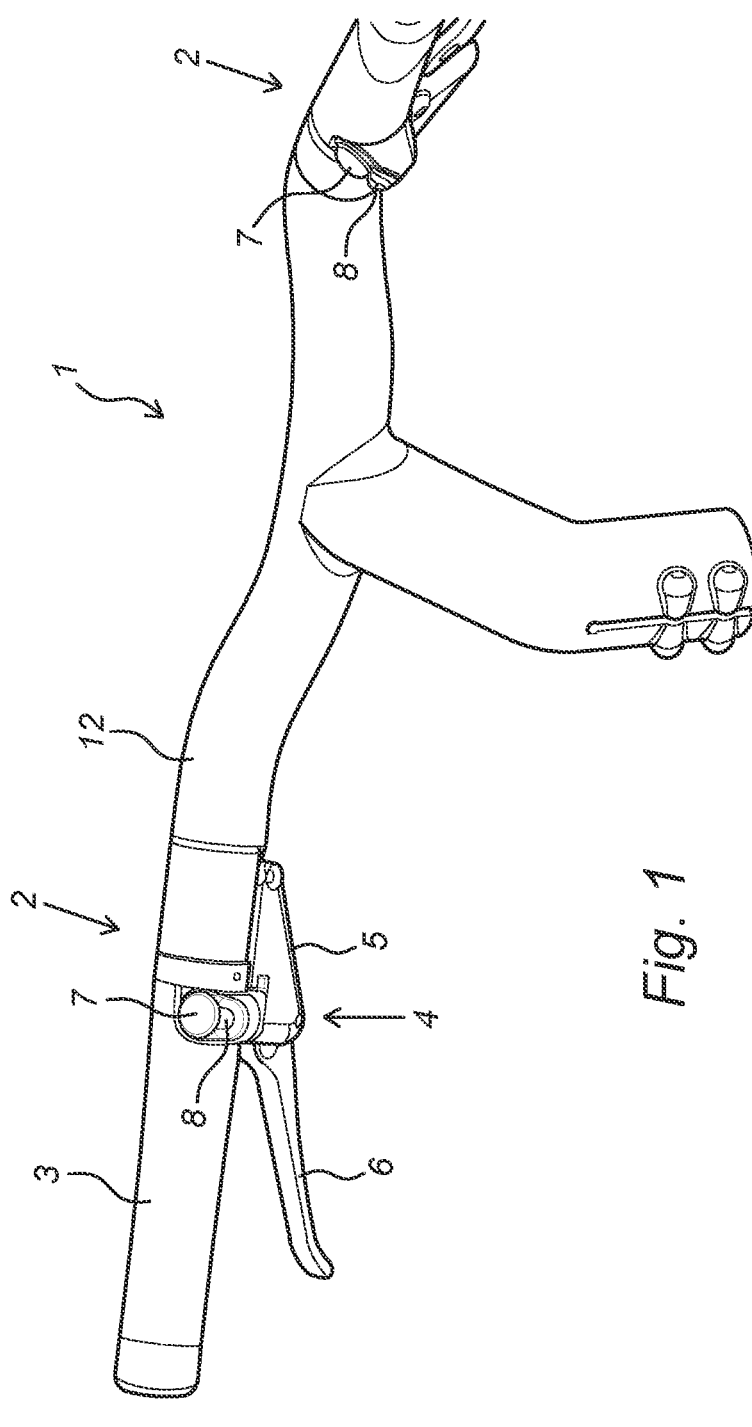
FIG. 1 shows a perspective view of an embodiment of a handlebar of a bicycle according to the invention.

FIG. 1 shows a perspective view of a bicycle handlebar 1. Said handlebar 1 may for example be rotatably mounted to a head tube of a frame of a bicycle. The handlebar 1 is provided with a handlebar grip 3, which handlebar grip 3 may be arranged on the handlebar 1 in a sliding movement. The grip 3 may as such be affixed to the buttons 7, 8 on the handlebar 1. Additionally, the grip 3 may be attached to the brake system 4 on the handlebar 1. The brake system 4 may comprise for example a housing part 5 and a lever 6, for operating the brake force applied by the brakes. Mutually coupling these parts may benefit the structural integrity thereof, and establish a better coupling between the components. At least one optical feedback unit 2 is provided between a central part 12 of the handlebar 1 and the grip 3. It is however noted that the placement of the optical feedback unit 2 as shown in this figure is merely indicative. The feedback unit 2 as such may also be located on a different position on the handlebar 1. The placement and the looks of the feedback unit 2 as such are a design choice. The buttons 7, 8 which are provided on the handlebar 1 may be used for changing a setting of a variable which may be displayed via the feedback unit 2. It is preferred that the handlebar feedback unit 2 comprises an array of optical elements, in particular light emitting diodes (LEDs). Said LEDs may be controlled independently, such that a magnitude of a variable to be visualized may be shown. The LEDs are preferably arranged under a casing of the feedback unit 2. The casing is in particular at least partially transparent and/or translucent, such that light emitted by the LEDs is visible to the user of the bicycle. The casing comprises an exposed outer surface, which in this non-limitative embodiment is substantially flush with the adjacent outer surface portions of the handlebar 1. The exposed outer surface of said casing is at least partially curved, preferably convexedly curved. Preferably, the at least partially curved exposed outer surface of said casing has a curvature which substantially corresponds with a curvature of at least one adjacent outer surface portion of the handlebar 1. In this non-limitative embodiment one adjacent outer surface portion of the handlebar 1, located adjacently to the exposed portion of the casing, makes part of a tubed part of the handlebar 1.

Figure 2:
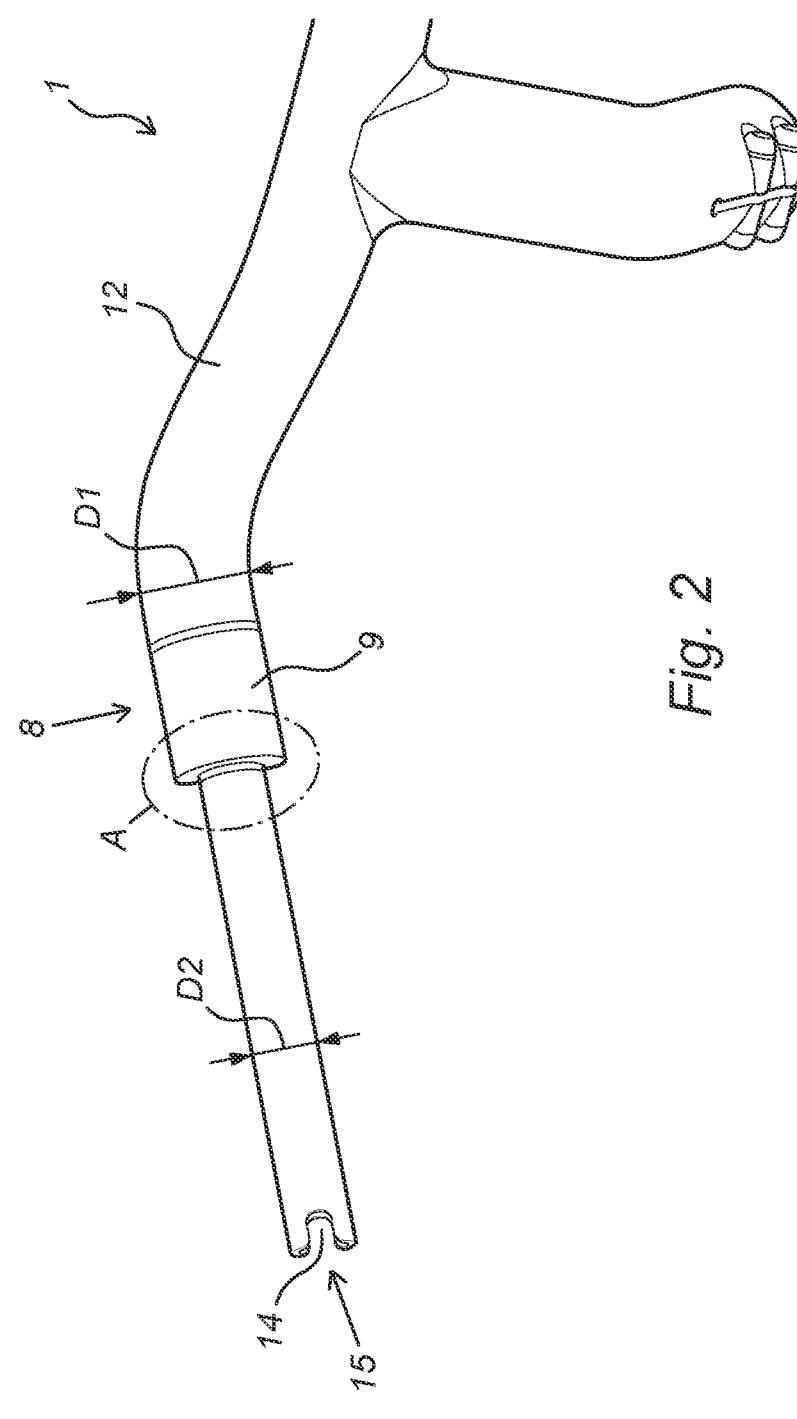
FIG. 2 shows a part of the handlebar as shown in FIG. 1.

FIG. 2 shows a part of the handlebar 1 as shown in FIG. 1, wherein the grip 3 and brake system 4 are removed for explanatory purposes. The feedback unit 2 according to the invention may be arranged in the area A. In particular the feedback unit 2 may abut the handlebar body 9, which is located in a transition portion 8 of the handlebar 1. That is, in the transition portion 8 of the handlebar 1, a diameter of the handlebar 1 decreases from a first diameter D1 to a second diameter D2. In particular the handlebar 1 comprises opposing narrowed end portions integrally connected to the central handlebar portion 12, wherein each of said narrowed end portions is at least partially accommodated within a grip 3 of the handlebar. The second diameter is preferably smaller than the first diameter. As such, an exterior surface of the feedback unit 2 may be substantially flush with the exterior surface of the central part 12 of the handlebar 1. The handlebar body 9 may be glued and/or welded onto the handlebar 1 as such. The handlebar body 9 may be applied onto the handlebar 1 by sliding the body 9 onto the handlebar 1 from an end thereof the handlebar body 9 may be arranged such that the change in diameter from the first diameter D1 to the second diameter 2 is a sudden change. That is, the decrease of diameter per length unit of handlebar 1 is significantly large. An additional benefit of said body is to receive a part of the feedback unit 2 according to the invention. The end of the handlebar 1 comprises an opening 15, which is in contact with an interior side of the handlebar 1. Said end of the handlebar 1 further comprises at least cut-out portion 14. The opening 15 and cut-out 14 may allow a cable of the feedback unit 2 to be at least partially routed internally in the handlebar 1.

Figure 3:
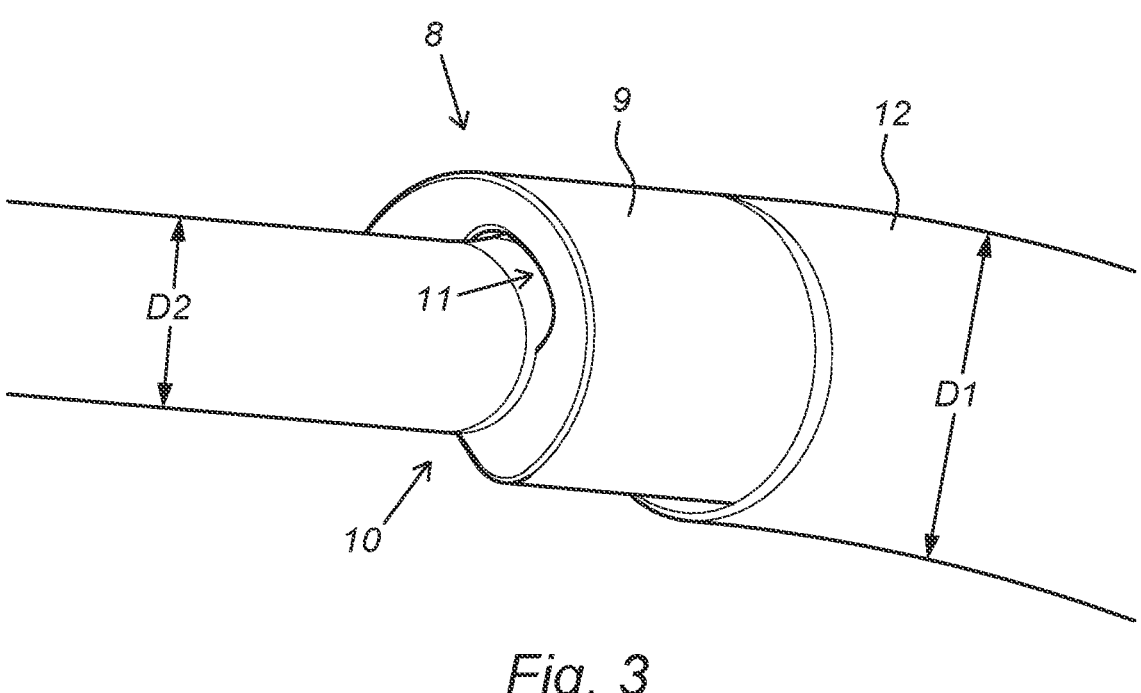
FIG. 3 depicts an enlarged view of the circle A in FIG. 2.

FIG. 3 shows an enlarged view of the encircled portion A of FIG. 2. The figure shows the handlebar body 9 which is attached to the handlebar 1 itself, such that the handlebar 1 has a sudden decrease in diameter. The central portion 12 of the handlebar 1 having a first diameter D1, and the end parts of the handlebar 1 having a smaller second diameter D2. The handlebar body 9 may comprise an accommodating space 11, for accommodating a part of the handlebar feedback unit 2. In particular said accommodating space 11 may be configured for enclosing a part of the handlebar feedback unit 2, such that it is partially fixed in its position. However, such an accommodating space 11 may be applied in any of the described embodiments. The figure further shows that a part 10 of the handlebar 1 is partially flattened. The flattened part 10 will be more extensively discussed based on FIG. 5.

Figure 4:
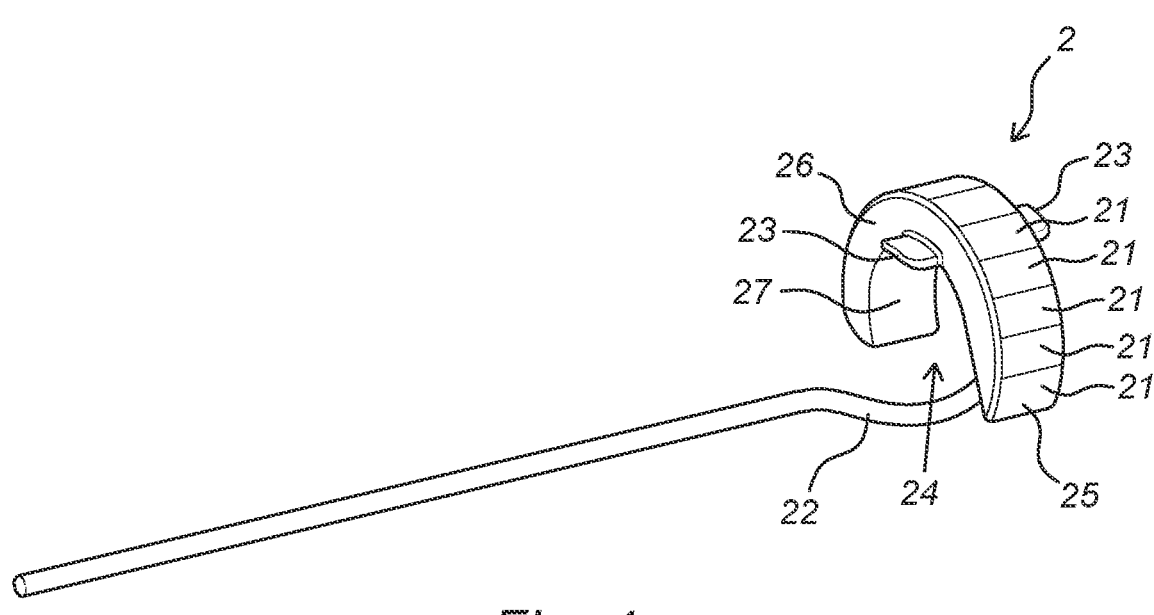
FIG. 4 shows a perspective view of an optical feedback unit according to an embodiment of the invention.

FIG. 4 shows an embodiment of the handlebar feedback unit 2 according to the invention. The handlebar feedback unit 2 as shown comprises an exposed surface 25, which surface is visible to the user. Said exposed surface 25 is at least partially composed out of a transparent and/or translucent material. The casing also comprises two side surfaces 26 and an inner surface 27. Said sideward surfaces and inner surface 27 may also be composed out of the transparent and/or translucent material, but may also be composed out of a polymer material. The exposed outer surface 25 may comprise a plurality of segments 21, wherein preferably at least one segment 21, in particular each segment 21 is independently controllable based on a control signal. The control signal is received via at least one cable 22. Said cable may for example comprise multiple wires, such as two Controller Area Network (CAN bus) wires, a power wire, shielding, and a ground wire. At least one of the side surfaces 26 may be provided with a positioning protrusion 23, for positioning the feedback unit 2 relative to the handlebar 1 and/or relative to other components, such as the handlebar body 9. Said positioning protrusion 23 may be a portion of a fastening element 23 according to the invention. In particular it is preferred that the positioning protrusion 23 is received by the accommodating space 11 of the handlebar body 9. The various segments 21 may each comprise their own optical element, such as a LED. It is conceivable that the segments 21, which may be light emitting surfaces 21 are visually separated, such that the number of optical elements that are turned on can be easily observed by a user. By changing the amount of the surfaces 21 that is lit up by the optical element of the feedback unit 2, an array of turned-on optical elements may be established. Turning on more optical elements may for example represent a higher velocity, or a higher battery charge. The handlebar feedback unit 2 comprises an open part 24, which open part interrupts the annular shape of the feedback unit 2. Preferably the feedback unit 2 is configured for at least partially enclosing a part of the handlebar 1. Preferably, said handlebar 1 and feedback unit 2 are at least partially coaxially oriented.

Figure 5:
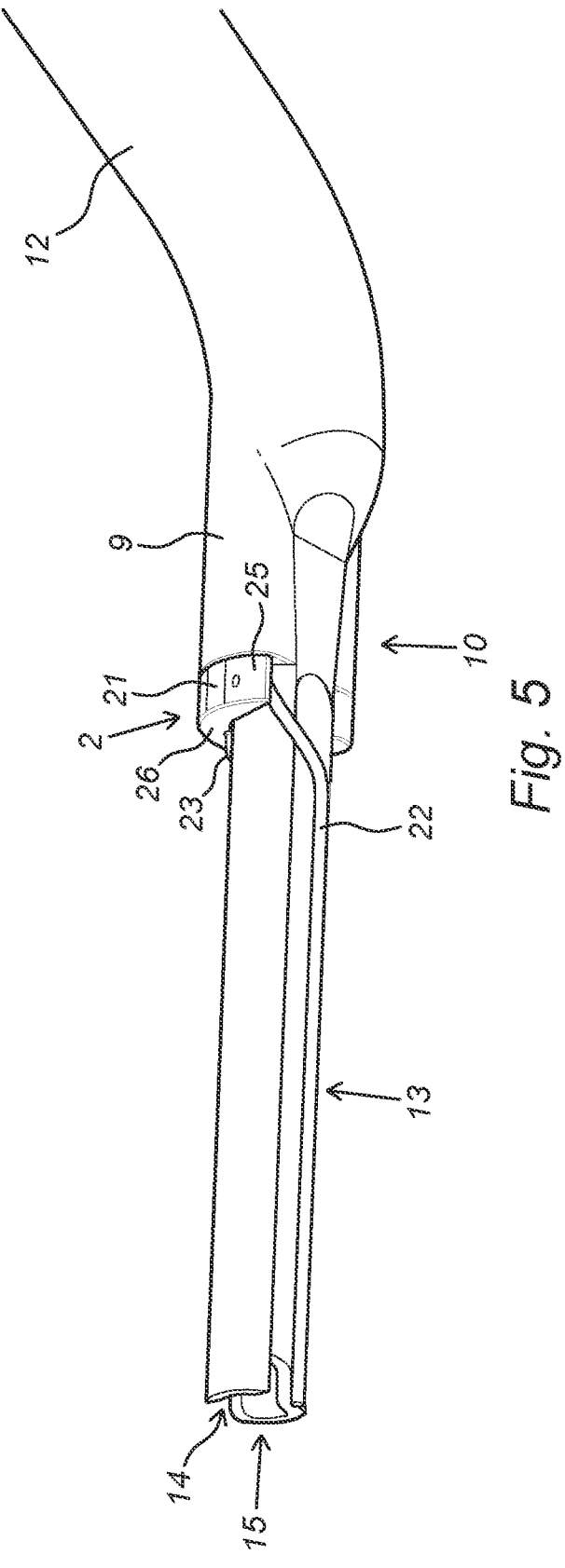
FIG. 5 shows a bottom perspective view of a part of a handlebar and optical feedback unit according to the invention.

FIG. 5 depicts a bottom side 10 of one end of the handlebar 1. The handlebar body 9 is present between the central portion 12 of the handlebar 1 and the end portion of the handlebar 1. Adjacent to the handlebar is the feedback unit 2, wherein one sideward surface 26 of the feedback unit 2 abuts the end surface of the handlebar body 9. The exposed exterior surface 25 of the handlebar feedback unit 2 is substantially flush with an exposed exterior surface of the handlebar body 9. The bottom side 10 of the handlebar, in particular an end portion thereof, comprises a recessed channel 13. The recessed channel 13 is configured for guiding wires and/or connectors of the handlebar feedback unit 2. The grip 3 of the handlebar 1 may eventually slide over said end part of the handlebar 1 such as to essentially entirely cover the wires of the feedback unit 2. The wires extend from the handlebar feedback unit 2, through the recessed channel 13, and then bend backward in a cut-out part 14, and then enter the interior of the handlebar 1 via an opening 15 in the end of the handlebar. As such, the wires may easily enter the interior side of the handlebar 1, without requiring a hole to be drilled in the handlebar 1 surface for each wire since this may harm the strength of the handlebar 1.

Figure 6:
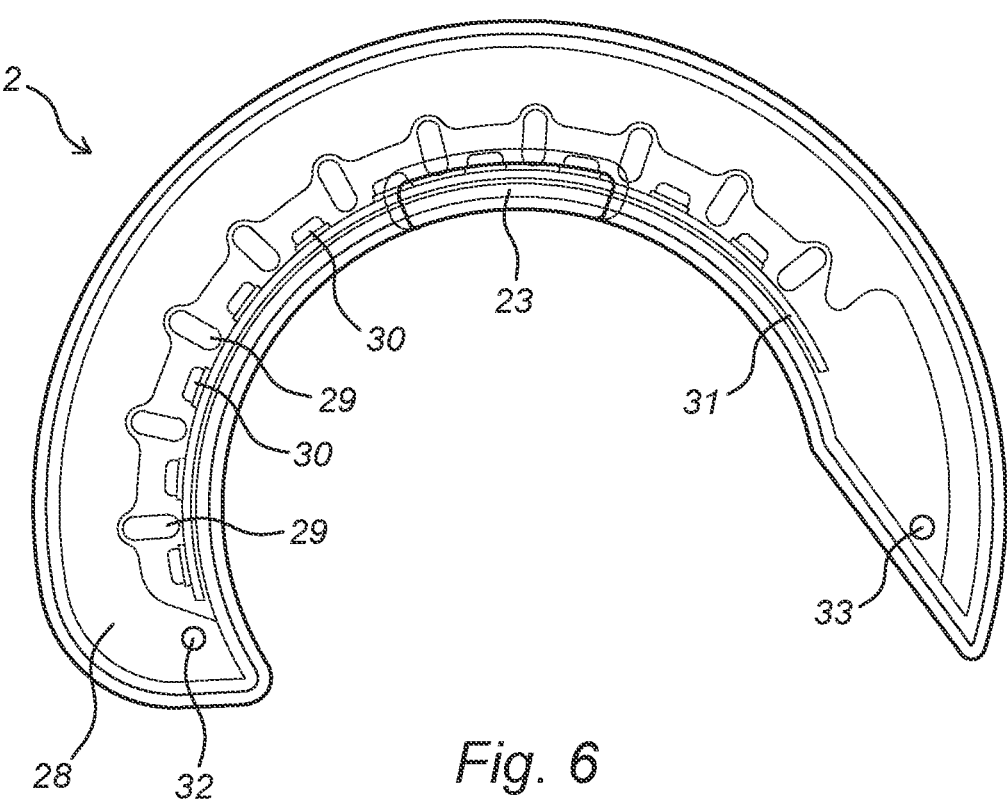
FIG. 6 shows a part of an interior of the optical feedback unit.
Figure 7:
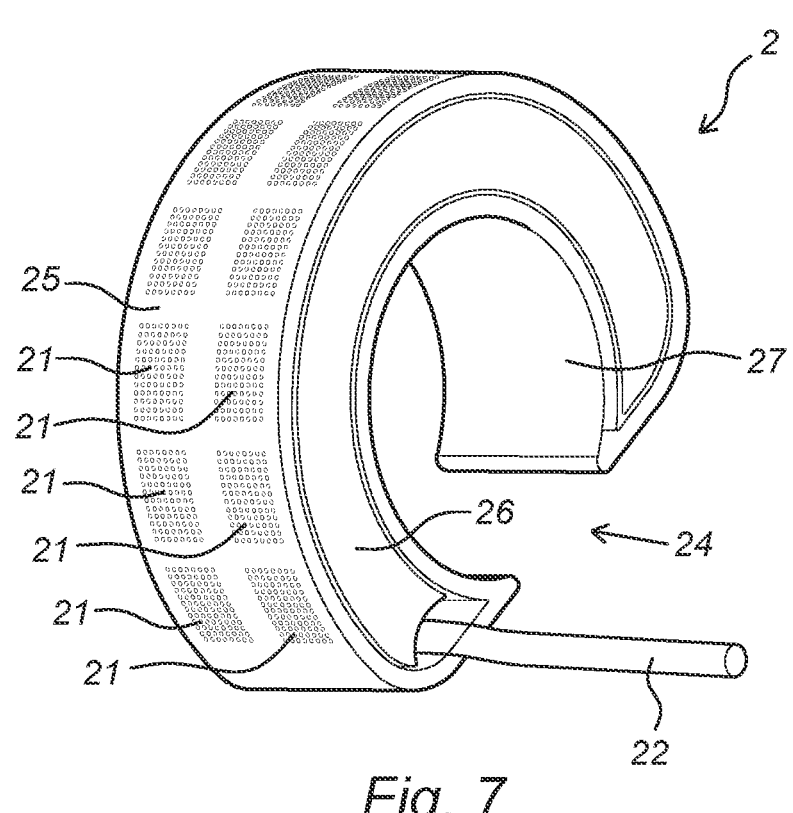
FIG. 7 shows an alternative embodiment of the optical feedback unit.
Figure 8:
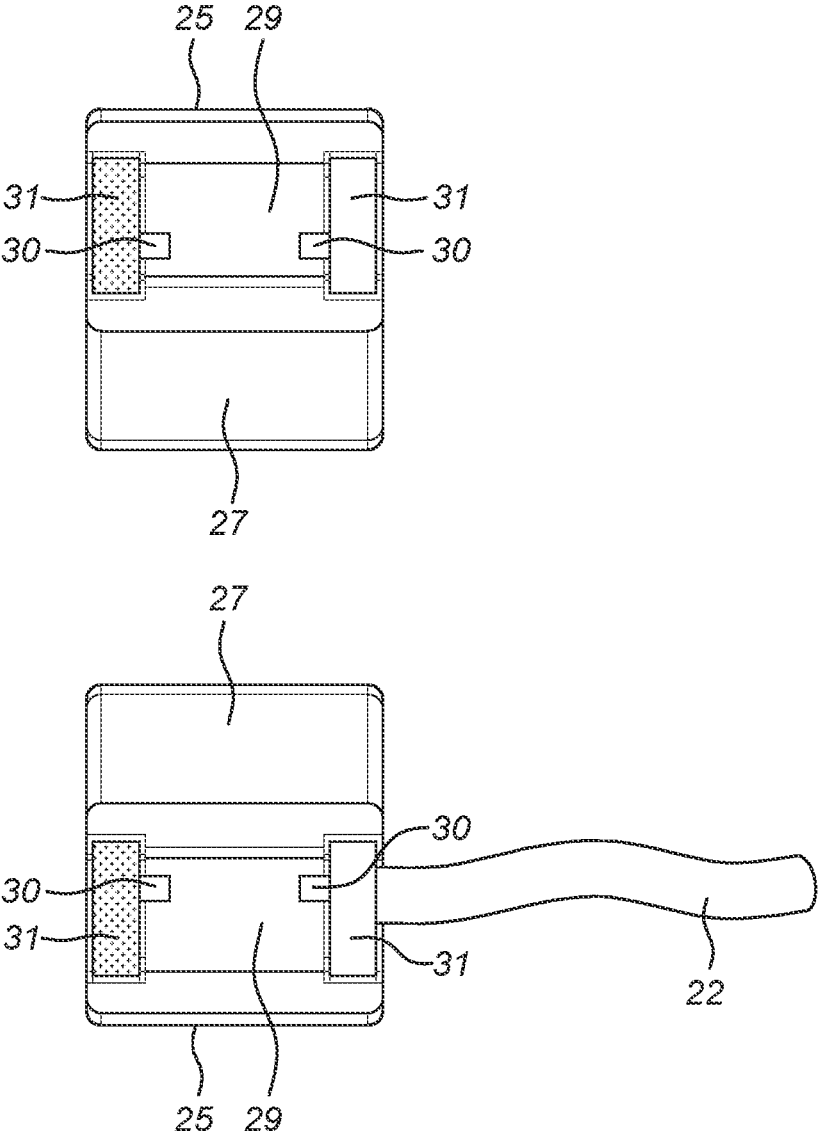
FIG. 8 shows a cross section of an optical feedback unit according to the invention.

FIG. 6 shows a view of the optical feedback unit 2 according to the invention. According to this non-limitative embodiment, the casing is composed out of two casing parts. Said two casing parts may be mutually coupled to establish a casing. Inside said casing a diffusing element 28 may be provided. Said diffusing element 28 is configured for spreading light emitted by the optical elements 30 equally over the exposed outer surface 25. The optical elements 30, which in this embodiment are LEDs are provided onto a printed circuit board 31. Said printed circuit board 31 may be flexible, or at least partially follows a curve of the handlebar. Preferably, said printed circuit board 31 is located as close to the handlebar as possible. The board 31 is preferably coaxially oriented with the handlebar. As such, the distance between the optical elements, in this case the LEDs 30 and the exposed outer surface 25 is as large as possible. This allows a better diffusion of the light emitted. The diffusing element 28 comprises at least one hole 32 which is configured to receive a pin 33 of one of the casing parts, preferably a pin 33 of each of the casing parts. As such, the two casing parts may mutually lock the diffusing element 28 into place via the pins 33. In order to provide the user with clearly distinguishable feedback, a number of separating elements 29 are provided. Said separating elements 29 are preferably provided between optical elements in radial direction. Said separating elements 29 may as shown in this embodiment be integrally formed with the casing, or a casing part. Said separating elements 29 may alternatively be attached to the printed circuit board 31, or other parts of the optical feedback unit 2. FIG. 7 shows an alternative embodiment of the optical feedback unit 2 according to the invention. In this non-limitative embodiment, the exposed outer surface 25 of the feedback unit 2 is provided with a plurality of perforated sections 21. Each section 21 is provided with a grouped number of perforations. Said perforations of the perforated section 21 allow light of an optical element to be transmitted towards the user. The perforated sections 21 are mutually separated by means of a non-perforated section. As such, a clear visual distinction is made between the perforated sections 21. This allows the user to clearly and visually observe the amount perforated sections that is lit up by an optical element that is provided under the perforated sections. Yet another embodiment of the feedback unit 2 according to the invention 2 is shown in FIG. 8. This embodiment comprises two printed circuit boards 31, each comprising a number of optical elements 30 attached thereon. One side of the printed circuit board 31 may as such directly form a side surface 26 of the optical feedback unit 2. It could also be conceivable to seal or cover said exterior side of the circuit board 31 with a casing part. In this non-limitative embodiment the interior of the optical feedback unit comprises a number of compartments, wherein said compartments are mutually separated by separating elements 29. Said separating elements 29 are configured for providing the user with a distinguishable indication of a, for example, battery level or bicycle speed. All of these embodiments have in common that the optical element may be controlled based on at least one control signal. In particular they may be controlled via at least one bicycle control unit. The optical feedback unit 2 as shown in these alternative embodiments each are configured for providing bicycle and/or user related optical feedback. The orientation of the optical elements 30, as well as the orientation and placement of the separating elements 29 may be arbitrarily chosen and therefore is part of a design choice. The present invention is related to providing the user with an optical feedback, preferably wherein said feedback is related to bicycle drive status or the like. Yet an alternative embodiment of the present invention is shown in FIG. 9. This embodiment the optical feedback unit 2 is arranged, or at least partially accommodated within the handlebar 1, to this end the handlebar 1 comprises an opening 32 which exposes the outer surface 25 of the casing part. In this embodiment the handlebar opening 32 is defined by a peripheral edge, wherein the exposed outer surface 25 abuts said peripheral edge. Within said exposed outer surface 25 a plurality of optical elements which form visual surfaces 21, in particular a matrix 21. Said matrix 21 may form a liquid-crystal display configured to be backlit by the optical elements 30 of said optical feedback unit 2. at least a part, preferably at least a peripheral portion, of the exposed outer surface 25 of said casing is positioned substantially flush with said peripheral edge of the handlebar opening 32. The matrix 21 of optical elements may be configured for representing the bicycle status information. At least one bicycle control unit is configured to generate at least one control signal based upon at least one bicycle drive status information type chosen from the group consisting of: the actual bicycle battery level, the actual motor support, changed settings related information, alarm function, bicycle related errors, bicycle related error codes, the actual speed, the average speed, the number of revolutions per minute (RPM), the selected gear, the ambient temperature, the ambient light level, and navigation related information, like the remaining distance, the remaining time, and the estimated time of arrival. A control signal may comprise information to control a selective number of optical elements corresponding with the bicycle related feedback to be given to the user. Preferably, at least one control signal comprises information relating to at least two bicycle drive status information types. The optical feedback units 2 as shown in these illustrative embodiments may also be combined. To this end, a number of optical feedback units 2 may be arranged side by side on one or two sides of the handlebar 1. Each optical feedback unit 2 may be configured for displaying a predefined value which may represent different status information of the bicycle. As such more information can be reverted to the user.

FIG. 10 shows a schematic overview of a bicycle 200 according to the invention. The bicycle 200 comprises a frame comprising a top tube 203, a seat tube 205, a bottom tube 206, a pair of seat stays 216, and a pair of chain stays 218. At the rear axis 219 a rear wheel 208 is rotatably arranged. The rear wheel may be powered by a used via a crank set 221. In order to drive de bicycle 200, the front side of the bicycle may comprise a handlebar 201, which may be rotatable with respect to the head tube 202 of the bicycle. The handlebar 201 may rotate the front wheel 207 which is arranged rotatably on a front axis 220. Said front wheel 207 may be held into place by means of the fork 217 which is rotatably coupled to the handlebar 201 of the bicycle 200. The handlebar 201 may be provided with a brake system 213 for allowing a user to apply a braking force. The handlebar 201 may comprise a first control unit 100, preferably arranged in a stem of the bicycle. Said first control unit may allow the accessory cables of the electronic accessories of the handlebar to be routed at least partially, preferably substantially entirely inside the frame of the bicycle 200. The first control unit 100 allows to reduce the number of cables running through a steerer tube. One or more optical feedback units 214 may be arranged on and/or in the handlebar 201 for providing the user with optical feedback related to a bicycle status. At least one optical feedback unit 214 is configured for providing bicycle 200 and/or user related optical feedback, in particular bicycle drive status related feedback, to a user of the bicycle, wherein said optical feedback unit 214 is mounted to and/or at least partially accommodated within said handlebar 201, wherein said optical feedback unit comprises an array of optical elements, preferably light emitting diodes (LEDs), at least one casing which is at least partially transparent and/or translucent, and which at least partially covers said optical elements, wherein said casing has an exposed outer surface which is substantially similarly shaped to at least one adjacent outer surface portion of the handlebar, and wherein at least one of the plurality of optical elements is controllable based on a control signal to provide said optical feedback to the user, and at least one bicycle control unit for generating at least one control signal for controlling at least one optical element of said optical feedback unit. Inside the bottom tube 206 a primary battery may be arranged for driving at least one electric motor which is arranged in the front axis 220 and/or rear axis 219. Optionally, a secondary battery 222 may be provided for extending the range of the bicycle 200. The primary battery inside the bottom tube 206 and/or the secondary battery 222 may be charged via a charging port 210 of the bicycle 200. The charging port 210 is arranged on a rear side of the bicycle in order to be easily accessible for a user. In this particular embodiment, the charging port 210 is arranged between the pair of seat stays 216 and attached to the seat tube 205 of the bicycle 200. In order for easily connecting the bicycle 200 to an external service device a service port 215 may be provided. In this embodiment the service port 215 is provided on a bottom side of the top tube 203 of the bicycle. Inside the top tube 203 at least one bicycle control unit may be provided. It is imaginable that at least one exposed exterior surface of at least one frame part comprises at least one antenna system. Said antenna system may be directly or indirectly mounted to said bicycle frame 203, 205, 206, 212, 216. The seat tube 205 further accommodates the seat post which may be attached to the saddle 204 of the bicycle 200. In order to increase the visibility of the user of the bicycle 200 during the evening or in the night-time, the bicycle 200 may be provided with a front light module 212 and/or a rear light module 211. Said front light module 212 and rear light module 211 may allow for dynamic light patterns and/or for emitting light in at least a left and/or right direction. The bicycle 200 as shown in this figure is merely illustrative for the components thereof. It is explicitly noted that some aspects of the bicycle 200 as shown in this figure may be chosen by way of design. In particular shapes of the light modules 212, 211 may at least partially be shaped by design. Moreover, the shape of the tubes 202, 203, 205, 206 of the bicycle may also at least partially be chosen by way of design. Hence, the aesthetical appearance of the depicted embodiment are matters of design choice and can be varied or eliminated as desired.

The above-described inventive concepts are illustrated by several illustrative embodiments. It is conceivable that individual inventive concepts, including inventive details, may be applied without, in so doing, also applying other details of the described example. It is not necessary to elaborate on examples of all conceivable combinations of the above-described inventive concepts, as a person skilled in the art will understand numerous inventive concepts can be (re) combined in order to arrive at a specific application and/or alternative embodiment.

The ordinal numbers used in this document, like "first", "second", and "third" are used only for identification purposes. Hence, the use of expressions like a "second" component, does therefore not necessarily require the co-presence of a "first" component. By "complementary" components is meant that these components are configured to co-act with each other. However, to this end, these components do not necessarily have to have complementary forms. The verb "comprise" and conjugations thereof used in this patent publication are understood to mean not only "comprise", but are also understood to mean the phrases "contain", "substantially consist of", "formed by" and conjugations thereof.

It will be apparent that the invention is not limited to the working examples shown and described herein, but that numerous variants are possible within the scope of the attached claims that will be obvious to a person skilled in the art. The aesthetical appearance and design of the working examples or details thereof, in particular as shown in the appended figures, is not technically determined, unless indicated otherwise, and is merely incorporate to demonstrate and clarify the inventive concept(s) described herein. Hence, the aesthetical appearance of the depicted embodiments are matters of design choice and can be varied or eliminated as desired. The owner of this patent document does moreover not disclaim any other rights that may be lawfully associated with the information disclosed in this document, including but not limited to, copyrights and designs associated with, based upon, and/or derived from the appended figures.

The invention claimed is:

1. A bicycle, comprising:
a bicycle frame,
a handlebar rotatably mounted to said bicycle frame,
at least one optical feedback unit for providing bicycle related feedback and/or user related optical feedback to a user of the bicycle, wherein said at least one optical feedback unit is mounted to and/or at least partially accommodated within said handlebar, wherein said at least one optical feedback unit and the handlebar are coaxially oriented, and wherein said at least one optical feedback unit comprises:
at least one linear array of at least three optical elements,
at least one casing which is at least partially transparent and/or translucent, and which at least partially covers said at least three optical elements, wherein said casing has an exposed outer surface which is substantially similarly shaped to at least one adjacent outer surface portion of the handlebar, and wherein at least one of the at least three optical elements is controllable based on a control signal to provide optical feedback to the user, and
at least one bicycle control unit for generating at least one control signal for controlling at least one optical element of said at least one optical feedback unit.

2. The bicycle according to claim 1, wherein the handlebar at least partially encloses said at least one optical feedback unit.

3. The bicycle according to claim 1, wherein at least a part of the exposed outer surface of said casing is positioned flush with at least one adjacent outer surface portion of the handlebar, and wherein at least a part of the exposed outer surface of said casing is positioned flush with the adjacent outer surface portion of the handlebar surrounding the casing.

4. The bicycle according to claim 1, wherein said at least one optical feedback unit is at least partially accommodated within said handlebar, and wherein the handlebar comprises at least one opening to expose the exposed outer surface of the casing, wherein the at least one opening is defined by a peripheral edge, wherein the exposed outer surface of said casing abuts said peripheral edge, wherein at least a part of the exposed outer surface of said casing is positioned flush with said peripheral edge of the at least one opening, and wherein the exposed outer surface of said casing is positioned flush with said peripheral edge of the at least one opening.

5. The bicycle according to claim 1, wherein the exposed outer surface of said casing is at least partially curved, wherein the at least partially curved exposed outer surface of said casing has a curvature which corresponds with a curvature of the at least one adjacent outer surface portion of the handlebar, and/or wherein said at least one adjacent outer surface portion of the handlebar is located adjacently to the exposed outer surface of the casing and makes part of a tubed part of the handlebar.

6. The bicycle according to claim 1, wherein the handlebar comprises:
at least two grips located at opposing outer ends of the handlebar, and
a central handlebar portion located in between said at least two grips, wherein the at least one optical feedback unit is located in between one of said at least two grips and said central handlebar portion, and/or
wherein the handlebar further comprises opposing narrowed end portions integrally connected to the central handlebar portion, and wherein each of said narrowed end portions is at least partially accommodated within a grip of the handlebar.

7. The bicycle according to claim 1, wherein the at least one optical feedback unit at least partially encloses the handlebar, and/or
wherein the at least one optical feedback unit is annular shaped.

8. The bicycle according to claim 1, wherein the at least three optical elements are equidistantly divided in a circumferential direction over the handlebar.

9. The bicycle according to claim 1, wherein the at least one optical feedback unit comprises a plurality of linear arrays, each linear array formed by at least three optical elements.

10. The bicycle according to claim 1, wherein at least four optical elements of the at least one optical feedback unit are arranged in a matrix array, and/or wherein the at least one bicycle control unit is connected to the at least one optical feedback unit, and wherein said at least one bicycle control unit is configured to control said at least one optical feedback unit.

11. The bicycle according to claim 1, wherein the at least one bicycle control unit is configured to generate the at least one control signal based upon at least one bicycle drive status information type chosen from the group consisting of: the actual bicycle battery level, the actual motor support, changed settings related information, alarm function, bicycle related errors, bicycle related error codes, the actual speed, the average speed, the number of revolutions per minute (RPM), the selected gear, the ambient temperature, the ambient light level, and navigation related information, like the remaining distance, the remaining time, and the estimated time of arrival, wherein the control signal comprises information to control a selective number of optical elements corresponding with the bicycle related feedback to be given to the user, wherein the at least one bicycle control unit is further configured to generate a combined control signal, wherein the combined control signal comprises information relating to at least two bicycle drive status information types, and wherein said combined control signal is configured to display at least one first bicycle drive status information type via at least one first group of optical elements of said at least one optical feedback unit, and to display at least one second bicycle drive status information type via at least one second group of optical elements of said at least one optical feedback unit.

12. The bicycle according to claim 1, wherein the at least one optical feedback unit comprises at least one separating element for separating light emitted by at least two optical elements, and/or wherein the at least one optical feedback unit comprises a liquid-crystal display configured to be backlit by the at least two optical elements of said at least one optical feedback unit, and/or wherein at least one optical element is formed by a light source chosen from the group consisting of: a light-emitting diode (LED), an organic light-emitting diode (OLED), a laser diode, a multi-colour light source, a capsule wherein at least one red diode, at least one green diode, and at least one blue diode are potted, and combinations thereof.

13. The bicycle according to claim 1, wherein the exposed outer surface of the casing is at least partially composed of glass or a polymer.

14. The bicycle according to claim 1, wherein the at least one optical feedback unit is wired to the at least one bicycle control unit via a wire, wherein said wire is at least partially routed inside the handlebar.

15. The bicycle according to claim 1, wherein the at least one bicycle control unit configured to generate the at least one control signal for the at least one optical feedback unit is, directly or indirectly, configured to communicate with at least one portable user device, and wherein said at least one bicycle control unit is configured to at least partially base said control signal on user related information received from the portable user device.

16. The bicycle according to claim 1, wherein the bicycle comprises at least two of said optical feedback units, wherein the at least two optical feedback units are arranged on or adjacent to opposing end portions of the handlebar, wherein the at least two optical feedback units are positioned side-by-side, and wherein the at least two optical feedback units are independently controllable.

17. The bicycle according to claim 1, wherein the bicycle comprises at least one sensor, and wherein at least one bicycle control unit is configured to generate a control signal for the at least one optical feedback unit, based on data collected by the at least one sensor.

18. An optical feedback unit for use in a bicycle according to claim 1.

19. A bicycle control unit programmed to control at least one optical feedback unit for use in a bicycle according to claim 1.

20. An assembly of at least one optical feedback unit according to claim 18 and at least one bicycle control unit.

* * * * *